(12) United States Patent
Lepage

(10) Patent No.: US 11,150,222 B2
(45) Date of Patent: Oct. 19, 2021

(54) METHOD AND SYSTEM FOR ACQUIRING ULTRASONIC TESTING DATA LEVERAGING A SLIDING RECEIVER APERTURE DEFINED ACCORDING TO THE PRINCIPLE OF ACOUSTIC RECIPROCITY

(71) Applicant: Olympus Scientific Solutions Americas Corp., Waltham, MA (US)

(72) Inventor: Benoit Lepage, Quebec (CA)

(73) Assignee: Olympus Scientific Solutions Americas Corp., Waltham, MA (US)

( * ) Notice: Subject to any disclaimer, the term of this patent is extended or adjusted under 35 U.S.C. 154(b) by 184 days.

(21) Appl. No.: 16/575,523

(22) Filed: Sep. 19, 2019

(65) Prior Publication Data

US 2021/0088480 A1    Mar. 25, 2021

(51) Int. Cl.
   *G01N 29/26*    (2006.01)
   *G01N 29/36*    (2006.01)
(52) U.S. Cl.
   CPC .......... *G01N 29/262* (2013.01); *G01N 29/36* (2013.01); *G01N 2291/105* (2013.01)
(58) Field of Classification Search
   CPC ....... G01N 2291/105; G01N 2291/106; G01N 29/262; G01N 29/36; G01N 29/44
   See application file for complete search history.

(56) References Cited

U.S. PATENT DOCUMENTS

| | | | | |
|---|---|---|---|---|
| 6,546,803 | B1* | 4/2003 | Ptchelintsev | B06B 1/0622 73/625 |
| 2006/0219013 | A1* | 10/2006 | Baba | G01N 29/069 73/618 |
| 2010/0106432 | A1* | 4/2010 | Kitazawa | G01S 7/52077 702/39 |
| 2020/0072039 | A1* | 3/2020 | Yang | G01N 29/223 |
| 2020/0121292 | A1* | 4/2020 | Kwan | G01S 7/52003 |
| 2021/0048413 | A1* | 2/2021 | Chinta | G01N 29/46 |

\* cited by examiner

*Primary Examiner* — Francis C Gray
(74) *Attorney, Agent, or Firm* — Schwegman Lundberg & Woessner P.A.

(57) ABSTRACT

Example embodiments of the present invention relate to methods, systems, and a computer program product for acquiring phased array ultrasonic testing data leveraging a sliding receiver aperture defined according to a principle of acoustic reciprocity. The method includes triggering each of a set of ultrasonic probe elements to pulse as a pulser element. For each pulser element, a respective subset of the ultrasonic probe elements may be defined as the sliding receiver aperture according to a principle of acoustic reciprocity to act as receiver elements to receive response signals. Data corresponding to the respective response signals for each pair of pulser element and receiver element then may be stored.

21 Claims, 9 Drawing Sheets

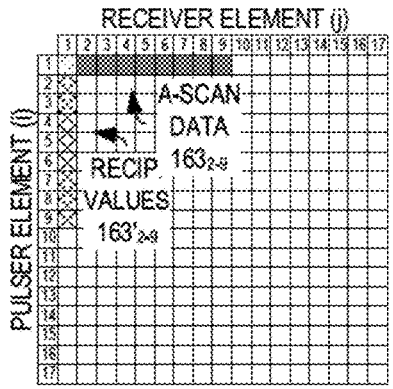
FIG. 2A (i=1)
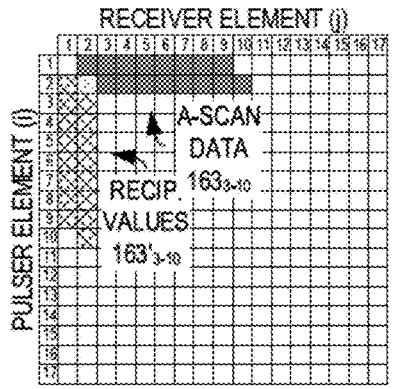
FIG. 2B (i=2)
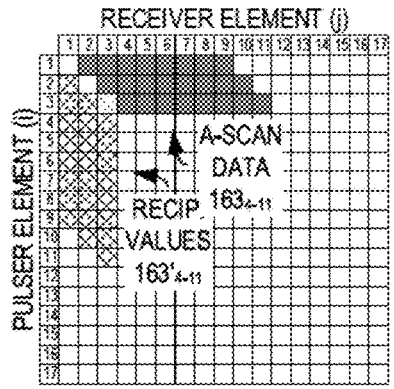
FIG. 2C (i=3)
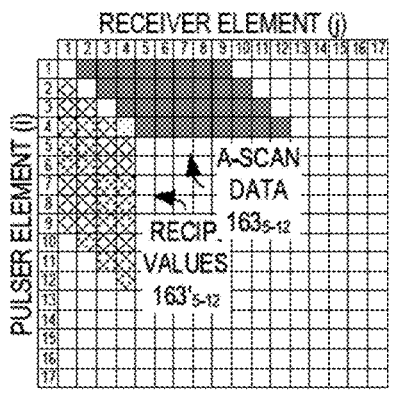
FIG. 2D (i=4)
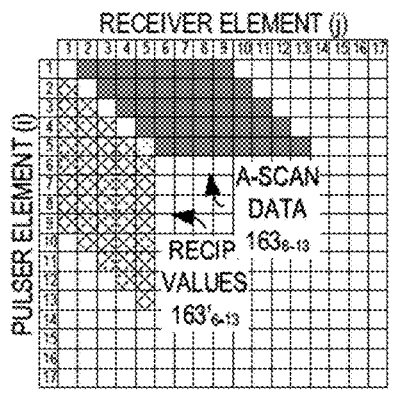
FIG. 2E (i=5)
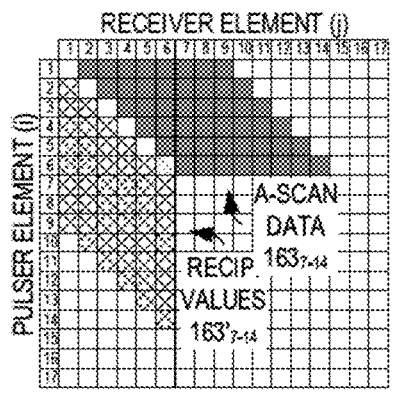
FIG. 2F (i=6)
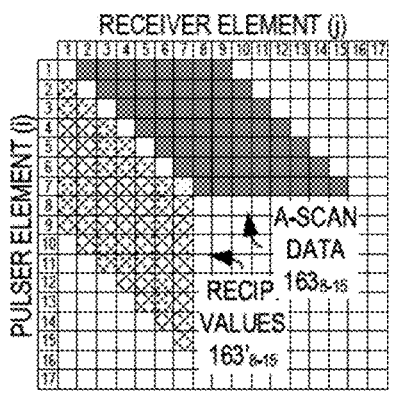
FIG. 2G (i=7)
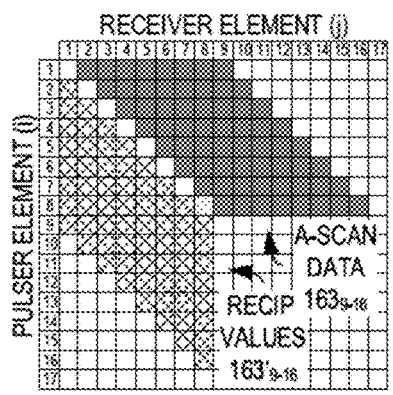
FIG. 2H (i=8)
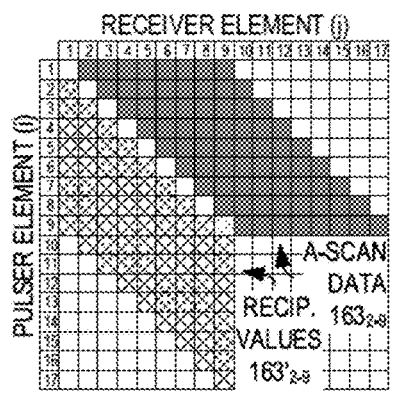
FIG. 2I (i=9)

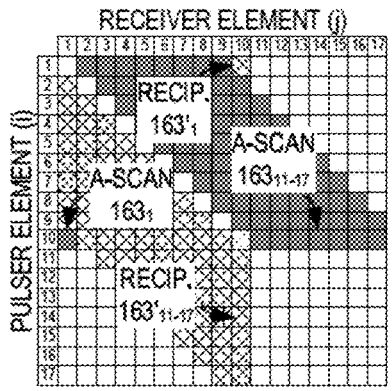
FIG. 2J (i=10)
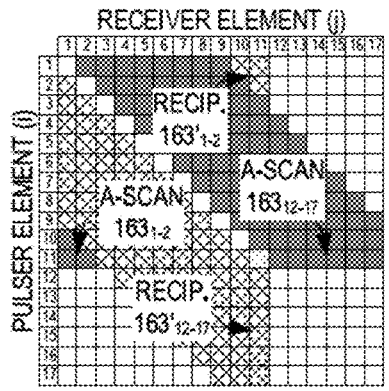
FIG. 2K (i=11)
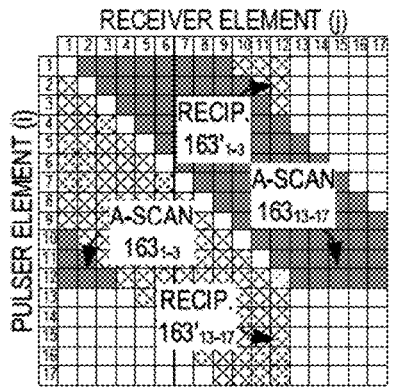
FIG. 2L (i=12)
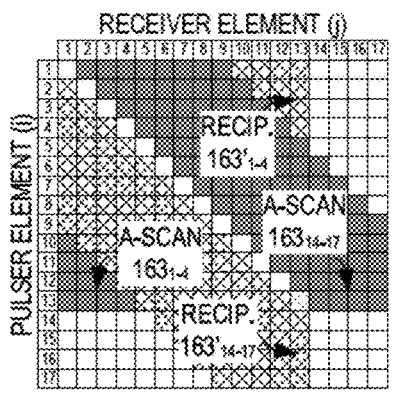
FIG. 2M (i=13)
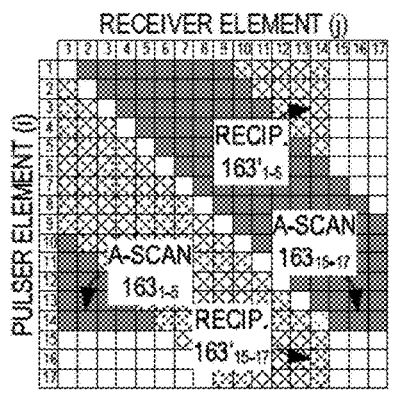
FIG. 2N (i=14)
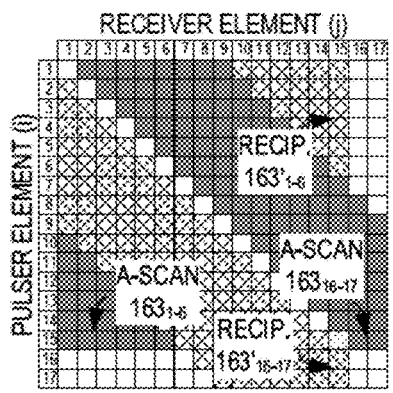
FIG. 2O (i=15)
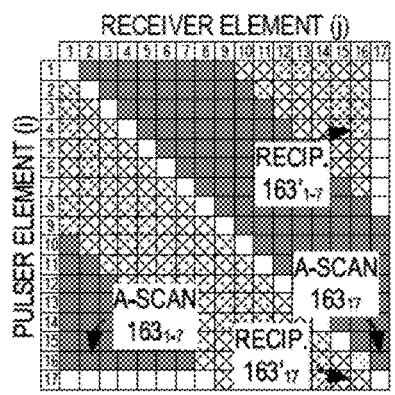
FIG. 2P (i=16)
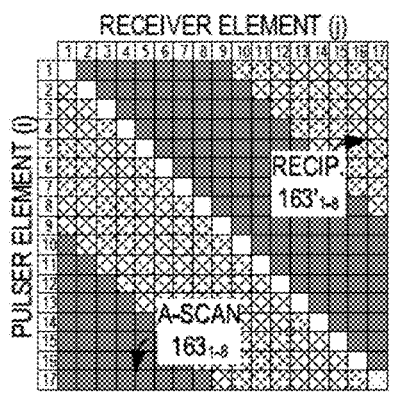
FIG. 2Q (i=17)

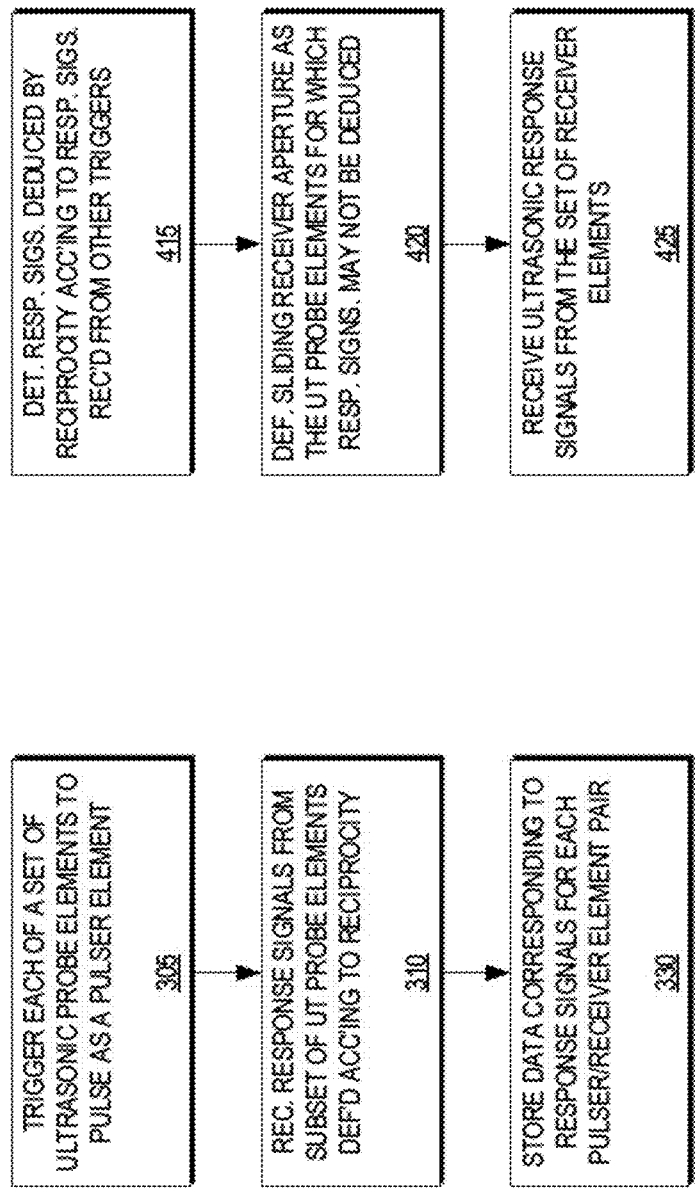

METHOD AND SYSTEM FOR ACQUIRING ULTRASONIC TESTING DATA LEVERAGING A SLIDING RECEIVER APERTURE DEFINED ACCORDING TO THE PRINCIPLE OF ACOUSTIC RECIPROCITY

TECHNICAL FIELD

This application relates to ultrasonic inspection.

BACKGROUND

In conventional phased array ultrasonic testing (PAUT) using full matrix capture (FMC) acquisition, a plurality of pulser elements of an ultrasonic array probe are individually pulsed multiple times and, for each pulse, a respective plurality of receiver elements receive response data. As understood in the art, the result of the FMC acquisition is a set of response A-scans representing ultrasound amplitude as a function of time-of-flight for each pulser-receiver pair.

SUMMARY

Example embodiments of the present invention relate to methods, systems, and a computer program product for acquiring ultrasonic testing data leveraging a sliding receiver aperture defined according to a principle of acoustic reciprocity. The method includes triggering each of a set of ultrasonic probe elements to pulse as a pulser element. For each pulser element, a respective subset of the ultrasonic probe elements may be defined as the sliding receiver aperture according to a principle of acoustic reciprocity to act as receiver elements to receive response signals. Data corresponding to the respective response signals for each pair of pulser element and receiver element then may be stored.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 2A-2Q are state diagrams illustrating indications of ultrasonic response signals received by a sliding receiver aperture and reciprocal values deduced by a principle of acoustic reciprocity for a respective pulser element according to an example embodiment of the present invention;

FIG. 3 is a flow diagram illustrating a method for acquiring ultrasonic testing data leveraging a sliding receiver aperture defined according to the principle of acoustic reciprocity according to an example embodiment of the present invention;

FIG. 4 is a flow diagram illustrating a method for receiving response signals from a respective subset of the ultrasonic probe elements as a respective set of receiver elements defined as a sliding receiver aperture according to a principle of acoustic reciprocity according to an example embodiment of the present invention;

FIGS. 6A-1-6B2 are state diagrams illustrating relationships between a number N of ultrasonic probe pulser elements and a minimum number $M_{MIN}$ of ultrasonic probe receiver elements for various ultrasonic probe pulser element values in pitch-catch and pulse-echo modes, respectively, according to an example embodiment of the present invention;

DETAILED DESCRIPTION

Figure 1:
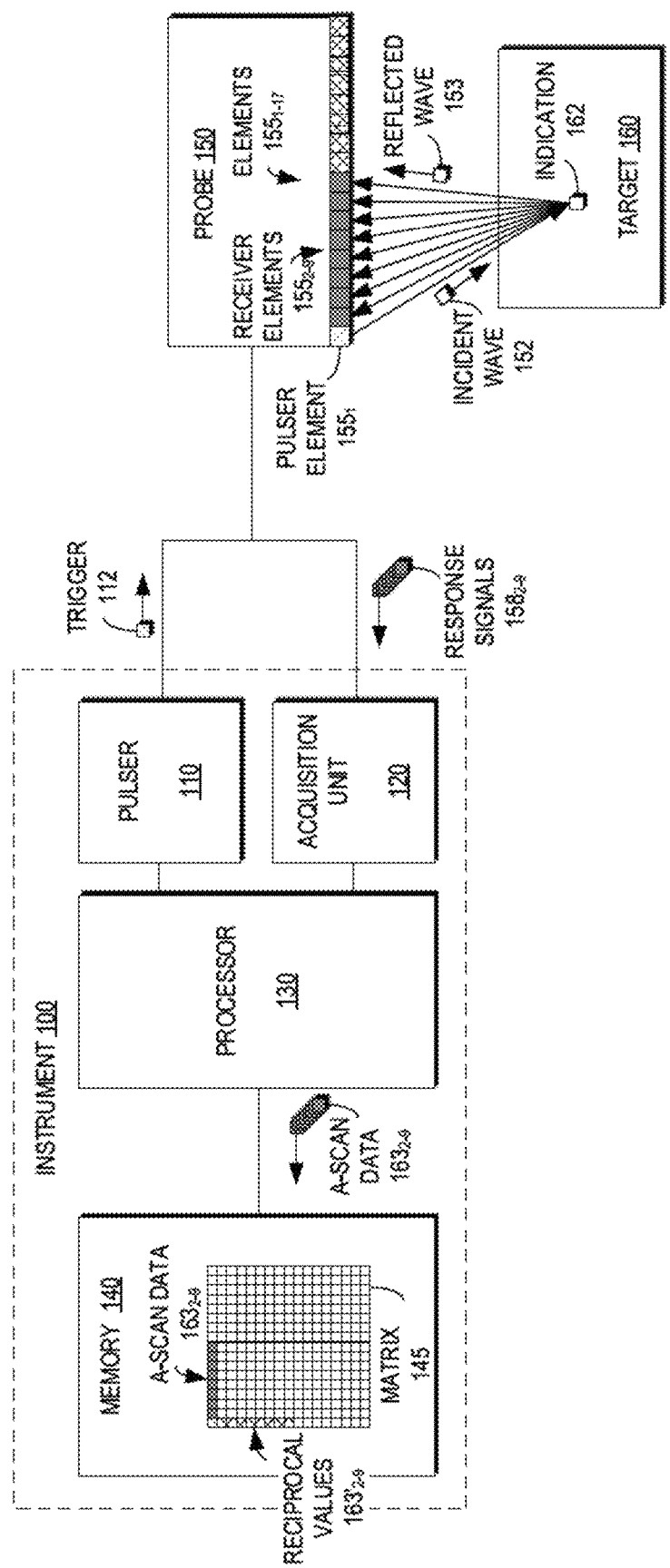
FIG. 1 is a block diagram illustrating a system for acquiring ultrasonic testing data leveraging a "sliding" receiver aperture defined according to the principle of acoustic reciprocity according to an example embodiment of the present invention.

Phased array ultrasonic testing (PAUT) is a powerful non-destructive testing (NDT) and non-destructive inspection (NDI) technology that may be employed in testing environments where conventional ultrasonic flaw detectors traditionally have been used. Weld inspection and crack detection are important applications and these tests are performed across a wide range of industries including aerospace, power generation, petrochemical, metal billet and tubular goods suppliers, pipeline construction and maintenance, structural metals, and general manufacturing. Phased arrays also may be used effectively to profile remaining wall thickness in corrosion survey applications.

The full matrix capture (FMC) technique is a powerful application of phased array ultrasonic technology that captures and stores all possible time-domain signals (e.g., ultrasound amplitude as a function of time-of-flight) (i.e., A-Scans) from every pair of ultrasonic probe pulser element and ultrasonic probe receiver element in the array (i.e., pulser-receiver pair). After recording, all raw information is available to generate the data resulting for any given beam (e.g., aperture, refracted/skew angles, focusing position)

through off-line processing. In the NDT/NDI industry, this process is often called an "FMC acquisition", an "acquisition of FMC matrix", or "filling an FMC matrix", etc. However, there are challenges associated with efficient FMC data collection.

Conventionally, for an ultrasonic probe with number N of probe elements, the size of the FMC matrix of pulser-receiver pairs is $N^2$, with each cell being designated as FMC(i,j) for pulser element i=1 through N and receiver element j=1 through N and being equivalent to the A-Scan data for that pulser-receiver pair, A(i,j). Therefore, conventionally, each acquisition position in full matrix capture applications acquires $N^2$ individual A-Scans. The hardware and software used for FMC data acquisition, such as the OmniScan® phased array flaw detector by Olympus Corporation, thus need to be able to handle a substantial number of A-Scans. FMC data files can easily reach several gigabytes and therefore the data transfer rate also may be a limiting factor of the data acquisition speed. Therefore, reducing the number of A-Scans that need to be acquired may not only reduce the acquisition times but it also may effectively reduce the transfer rate and storage capacity required of the hardware.

Another limitation on performing full matrix capture with is the maximum number of probe elements that simultaneously may be used to receive and acquire A-scan data following pulsing of any one of the probe elements (i.e., the aperture size M). Multiplexing often is used to reduce instrument cost by lowering the number of electronics needed in pulsing the ultrasonic probe and receiving the response signals from the ultrasonic probe. However, consequences of the reduction in cost by using multiplexers is a limitation on the maximum aperture size and an increase in acquisition time because pulser elements need to be pulsed multiple times for the receivers to acquire sufficient response signals to fill the FMC matrix while avoiding conflicts at the multiplexers. Conversely, eliminating multiplexers to increase the aperture size, and therefore reduce the acquisition time, introduces significant instrument hardware costs.

Consequently, with ultrasonic probes having, for example, as many as 256 or more elements, conventional FMC acquisition may suffer from long acquisition times and costly acquisition electronics. Filling the FMC matrix may be facilitated by application of the principle of acoustic reciprocity, which is a fundamental property that is obeyed by waves propagating between two points in space, given certain assumptions (e.g., the propagation medium is at rest). In its simplest terms, the principle of acoustic reciprocity states that, if a wave can propagate from a source to a receiver, the opposite propagation path (i.e., from the receiver to the source) is equally possible. Therefore, in applying the principle of acoustic reciprocity, the pulser and receiver elements of the ultrasonic probe may be interchanged without changing the waveform observed at the receiver end.

Accordingly, example embodiments of the present invention leverage the principle of acoustic reciprocity to reduce the number of ultrasonic response signals that must be received, and therefore the amount of A-Scan data that must be stored, by defining A(j,i) to be equivalent to A(i,j). In certain embodiments, the A-Scan data A(i,j) may be copied to a memory location for A(j,i); however, referring to the reciprocal value rather than storing the A-Scan data twice reduces the amount of A-Scan storage needed and reduces the amount of compute power dedicate to data storage.

Figure 5A:
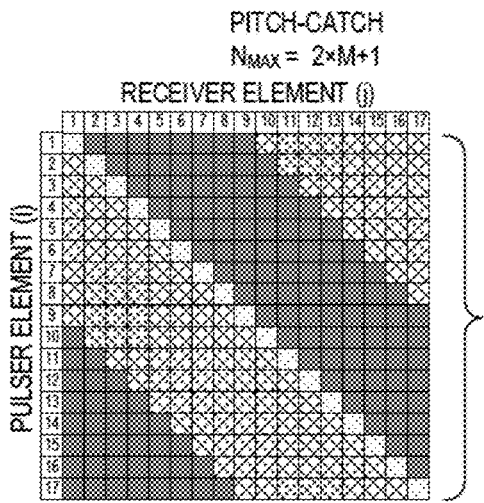
FIGS. 5A-5B are state diagrams illustrating relationships between a number M of ultrasonic probe receiver elements in the sliding receiver aperture and a maximum number $N_{MAX}$ of ultrasonic probe pulser elements in pitch-catch and pulse-echo modes, respectively, according to an example embodiment of the present invention.
Figure 5B:
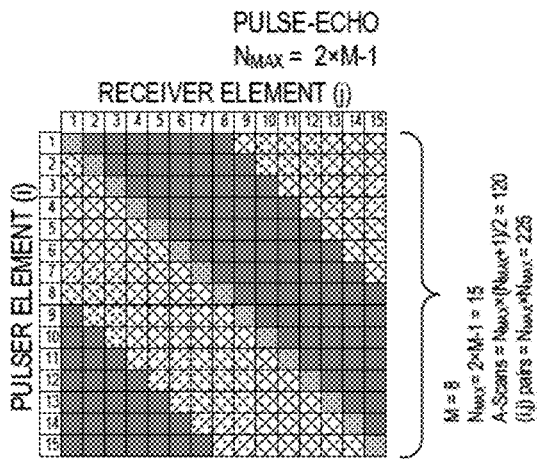

Further, as will be described in detail below, example embodiments of the present invention leverage a "sliding" receiver aperture defined according to the principle of acoustic reciprocity that generates many of the benefits of a larger aperture without the associated electronic cost. For example, an instrument having eight pulsers and thirty-two receivers (i.e., an 8:32 electronic) may be used with a probe having seventeen or more elements with seventeen of them acting as pulser elements (i.e., N=17) to fill the FMC matrix in N pulses by leveraging the sliding receiver aperture together with the principle of acoustic reciprocity. In other words, the 8:32 electronic has an equivalent effectiveness as a 17:17 electronic for generating an FMC matrix with a seventeen element probe (except for the diagonal in which j=i) (e.g., as illustrated in FIG. 5A). Likewise, the 8:32 electronic has an equivalent effectiveness as a 15:15 electronic for generating a full FMC matrix with a fifteen element probe (e.g., as illustrated in FIG. 5B). Applied to a 32:128 electronic, example embodiments of the present invention enable full matrix capture with, for example, probes up to sixty-five elements in sixty-five pulses, which would make the 32:128 electronic as effective as a 65:65 electronic. Accordingly, example embodiments of the present invention are able to acquire a full FMC matrix through a single pulsing of the N pulser elements without having to increase the ultrasonic response receiving capacity of the instrument (e.g., the number of acquisition units).

Therefore, in example embodiments of the present invention, by applying the principle of acoustic reciprocity and leveraging the sliding receiver aperture, the number of A-Scans required to acquire data for FMC can be reduced from $N^2$ to $N \times (N-1)/2$ in pulse-echo mode and to $N \times (N-1)/2$ in pitch-catch mode (i.e., the pulser element does not also act as a receiver element). Although ultrasonic response signals are not received sufficient to fill the FMC matrix completely for all pulser-receiver pairs leveraging the principle of reciprocity in pitch-catch mode, the absence of this A-Scan data (i.e., for j=i or the diagonal of the FMC matrix) has been shown experimentally to produce only a very small effect on the resulting acoustic images after beam forming.

FIG. 1 is a block diagram illustrating a system (e.g., NDT/NDI instrument) 100 for acquiring ultrasonic testing data leveraging a "sliding" receiver aperture defined according to the principle of acoustic reciprocity. As illustrated in FIG. 1, the instrument 100 comprises a pulser 110 and an acquisition unit 120 and, as understood in the art, is configured for performing ultrasonic inspection using an ultrasonic probe 150 on a target 160 (i.e., with or without direct contact of the probe 150 with the target 160). The pulser 110 is configured to send a trigger 112 to each of the ultrasonic probe elements 155, preferably one element 155 at a time, and the acquisition unit 120 is configured to receive response signals 158.

The ultrasonic probe 150 includes a plurality of ultrasonic probe elements $155_{1-17}$ (155, generally) which, at times, may act as either a pulser element (e.g., pulser element $155_1$ of FIG. 1) or a receiver element (e.g., receiver elements $155_{2-9}$ of FIG. 1). Further, as understood in the art, the probe 150 may comprise a plurality of physical probes under the control of the pulser 110 and the ultrasonic probe elements 155 need not comprise the full range of elements available on the ultrasonic probe(s) 150.

For example, in operation as illustrated in FIG. 1, the pulser 110 sends a trigger 112 to an ultrasonic probe element acting as a pulser element $155_1$ (e.g., i=1) which, in turn, generates an ultrasonic incident wave 152 directed at the indication 162. An ultrasonic reflected wave 153 from the indication 162 is then detected by the ultrasonic probe 150. As illustrated in FIG. 1, a subset of the ultrasonic probe elements $155_{1-17}$ act as receiver elements $155_{2-9}$ (e.g., $2 \leq j \; 9$) (i.e., the "sliding" receiver aperture for the first ultrasonic probe element $155_1$ acting as the pulser element (e.g., i=1)) to detect the reflected wave 153. The ultrasonic probe 150 then sends response signals $158_{2-9}$ (158, generally) indicative of the reflected wave 153 as detected by the respective receiver elements $155_{2-9}$ to the acquisition unit 120 for digitization. The digitized data may be A-Scan data $163_{2-9}$ (163, generally) (e.g., A(i,j)) representative of the reflected wave 153 for each pulser-receiver pair (e.g., $A(1,2) \leq A(i,j) \leq$ through A(1,9)). This A-Scan data $163_{2-9}$ then may be stored to memory 140.

FIGS. 2A-2Q are state diagrams illustrating indications of ultrasonic response signals received by a sliding receiver aperture and reciprocal values deduced by a principle of acoustic reciprocity for a respective pulser element according to an example embodiment of the present invention. For simplicity of illustration, FIGS. 2A-2Q illustrate receipt states of ultrasonic response signals 158 for an example embodiment of the present invention in pitch-catch mode, a mode of operation of the instrument 100 in which the pulser element does not also act as a receiver element and ultrasonic response signals 158 are received for all pulser-receiver pairs leveraging the principle of reciprocity to fill the FMC matrix except for the diagonal (i.e., j=i). However, it should be understood that, in other example embodiments of the present invention, as further shown in FIG. 5B, for pulse-echo mode, another mode of operation of the instrument 100 in which the pulser element does also act as a receiver element, ultrasonic response signals 158 for all pulser-receiver pairs are received sufficient to fill the FMC matrix completely according to the principle of reciprocity. FIGS. 2A-2Q will be described in conjunction with FIG. 1.

FIG. 2A is a state diagram corresponding to the state of A-Scan data acquisition resulting from the above description of FIG. 1. As illustrated in FIG. 2A, for the ultrasonic probe 150 having seventeen elements $155_{1-17}$, the triggering of the first probe element $155_1$ as the pulser element (i.e., i=1) results in the acquisition unit 120 receiving ultrasonic response signals $158_{2-9}$ from the second through ninth probe elements $155_{2-9}$ as receiver elements (i.e., $2 \leq j \leq 9$). The acquisition unit 120 then may use these ultrasonic response signals $158_{2-9}$ to generate A-scan data $163_{2-9}$ for each pulser-receiver pair (i.e., $A(1,2) \leq A(i,j) \leq A(1,9)$). Then, according to the principle of acoustic reciprocity, reciprocal values $163'_{2-9}$ (163', generally) (i.e., $A(2,1) \leq A(j,i) \leq A(9,1)$) may be assumed to be equivalent to the received A-scan data $163_{2-9}$ (i.e., $A(1,2) \leq A(i,j) - A(1,9)$).

As a result of this assumption through the principle of acoustic reciprocity, response signals 158 for these pulser-receiver pairs need not be known or received by the acquisition unit 120 and A-Scan data 163 need not be digitized and stored. Further, as illustrated in FIG. 2A, ultrasonic response signals 158 are not received from the tenth through seventeenth ultrasonic probe elements $155_{10-17}$ as subsequent pulses of other ultrasonic probe elements acting as the pulser element will probe ultrasonic response signals 158 from which reciprocal A-Scan data 163' may be assumed. Therefore, example embodiments of the present invention may be described as receiving ultrasonic response signals (e.g., $158_{2-9}$ as illustrated in FIGS. 1 and 2A) from only those receiver elements (e.g., $155_{2-9}$ as illustrated in FIGS. 1 and 2A) for which reciprocal values cannot be assumed via the principle of acoustic reciprocity according to ultrasonic response signals received in pulsings of subsequent pulser elements (i.e., $2 \leq I \leq N$ as illustrated in FIGS. 1 and 2A) in the set of ultrasonic probe elements.

FIG. 2B illustrates a state diagram corresponding to the state of A-Scan data acquisition resulting from the second probe element $155_2$ acting as the pulser element (i.e., i=2) and the third through tenth probe elements $155_{3-10}$ acting as receiver elements (i.e., $3 \leq j \leq 10$). As illustrated in FIG. 2B, A-scan data $163_{3-10}$ is generated for each pulser-receiver pair (i.e., $A(2,3) \leq A(i,j) \leq A(2,10)$) and, according to the principle of acoustic reciprocity, reciprocal values $163'_{3-10}$ (i.e., $A(3,2) \leq A(j,i) \leq A(10,2)$) may be assumed. As illustrated in FIG. 2B, the set of receiver elements (i.e., the receiver aperture) has shifted one element (e.g., from the second through ninth ultrasonic probe elements $155_{2-9}$ to the third through tenth ultrasonic probe elements $155_{3-10}$) (i.e., a "sliding" receiver aperture).

FIGS. 2C-2I similarly illustrate state diagrams corresponding to the state of A-Scan data acquisition resulting from the next seven shifts of the sliding receiver aperture with FIG. 2C illustrating the third ultrasonic probe element $155_3$ acting as the pulser element (i.e., i=3) with the fourth ultrasonic probe element $155_4$ through eleventh ultrasonic probe element $155_{11}$ being the receiver elements (i.e., $4 \leq j \leq 11$) in the sliding receiver aperture. As illustrated in FIGS. 2D-2I, as the pulser element successively shifts from the third ultrasonic probe element $155_3$ (i.e., i=3) to the ninth ultrasonic probe element $155_9$ (i.e., i=9), the sliding receiver aperture also successively shifts to the tenth ultrasonic probe element $155_{10}$ through the seventeenth ultrasonic probe element $155_{17}$ (i.e., $10 \leq j \leq 17$). As described above, ultrasonic response signals 158 may be received from which A-Scan data 163 may be generated and reciprocal A-Scan data 163' assumed.

FIG. 2J illustrates a state diagram corresponding to the state of data acquisition resulting from the tenth probe element $155_{10}$ acting as the pulser element (i.e., i=10). However, in contrast to conventional phased array ultrasonic technology techniques, the sliding receiver aperture may comprise sets of discontinuous ultrasonic probe elements 155, and the eleventh through seventeenth and first ultrasonic probe elements $155_{1,11-17}$ act as receiver elements (i.e., $11 \leq j \leq 17$ and j=1). As illustrated in FIG. 2J, A-scan data $163_{11-17,1}$ is generated for each pulser-receiver pair (i.e., $A(10,11) \leq A(i,j) \leq A(10,17)$ and A(i,j)=A(10,1)) and, according to the principle of acoustic reciprocity, reciprocal values $163'_{11-17,1}$ (i.e., $A(11,10) \leq A(j,i) \leq A(17,10)$ and A(j,i)=A(1,10)) may be assumed. For illustrative purposes, with reference to FIGS. 2J-2Q, if the plane in which the matrix of pulser-receiver pairs is viewed is turned into a cylinder, the set of ultrasonic probe elements 155 of the sliding receiver aperture may continue back to the beginning of the set of ultrasonic probe elements 155 or, in other words, may "wrap around" to the first ultrasonic probe element 155.

FIGS. 2K-2Q similarly illustrate state diagrams corresponding to the state of A-Scan data acquisition resulting from the next seven shifts of the sliding receiver aperture with FIG. 2K illustrating the eleventh ultrasonic probe element $155_{11}$ acting as the pulser element (i.e., i=11) with the twelfth ultrasonic probe element $155_{12}$ through seventeenth ultrasonic probe element $155_{17}$ and first ultrasonic probe element $155_1$ through second ultrasonic probe element $155_2$ being the receiver elements (i.e., $12 \leq j \leq 17$ and $1 \leq j \leq 2$) in the sliding receiver aperture. As illustrated in FIGS. 2L-2Q, as the pulser element successively shifts from the eleventh ultrasonic probe element $155_{11}$ (i.e., i=11) to the seventeenth ultrasonic probe element $155_{17}$ (i.e., i=17), the sliding receiver aperture also successively shifts to the first ultrasonic probe element $155_1$ through the eighth ultrasonic probe element $155_8$ (i.e., $1 \leq j \leq 8$). As described above, ultrasonic response signals 158 may be received from which A-Scan data 163 may be generated and reciprocal A-Scan data 163' assumed.

FIG. 3 is a flow diagram illustrating a method for acquiring ultrasonic testing data leveraging a sliding receiver aperture defined according to the principle of acoustic reciprocity according to an example embodiment of the present invention. As illustrated in FIG. 3, and with reference to FIGS. 1 and 2A-2Q, the instrument 100 may trigger 112 each of a set of ultrasonic probe elements $155_{1-17}$ to pulse as a pulser element (305) (e.g., the first ultrasonic probe element $155_1$ through the seventeenth ultrasonic probe element $155_{17}$ as illustrated in FIGS. 2A-2Q). Then, for each pulsing of a respective pulser element, the instrument 100 may receive response signals 158 from a subset of the ultrasonic probe elements 155 defined as a "sliding" receiver aperture according to a principle of acoustic reciprocity (310) (e.g., with respect to FIGS. 1 and 2A, the second ultrasonic probe element $155_2$ through the ninth ultrasonic probe element $155_9$ and, with respect to FIG. 2Q, the first ultrasonic probe element $155_1$ through the eighth ultrasonic probe element $155_8$). Further details of how to define the set of receiver elements in the sliding receiver aperture are described below with respect to FIGS. 7 and 8. The instrument 100 then may store data 163 corresponding to the respective response signals 158 for each pair of pulser element and receiver element (330). Note that, in example embodiments of the present invention, the reciprocal data 163' need not be stored which therefore reduces the storage requirements necessary for data acquisition and compute requirements necessary for data storage.

FIG. 4 is a flow diagram illustrating a method for receiving response signals (e.g., 310 of FIG. 3) at a respective subset of the ultrasonic probe elements 155 as a respective set of receiver elements defined as a sliding receiver aperture according to a principle of acoustic reciprocity according to an example embodiment of the present invention. As illustrated in FIG. 4, the instrument 100 may determine response signals that may be deduced by the principle of acoustic reciprocity according to response signals received from triggering the other pulser element (415). Then the instrument 100 may define the sliding receiver aperture as the ultrasonic probe elements 155 for which response signals may not be deduced (420). In other words, and as illustrated below in FIGS. 5A-9, in example embodiments of the present invention, the instrument may plan the pulsing of each ultrasonic probe element and, for each pulser element, determine which ultrasonic probe elements should act as receiver elements of the sliding receiver aperture (e.g., those ultrasonic probe elements for which reciprocal ultrasonic response signals will not be received by subsequent pulser element pulsings). For example, as illustrated in FIGS. 5A-5B, the instrument 100 may determine the set of receiver elements M in the sliding receiver aperture based on one or more of the number of number of ultrasonic probe elements 155, a mode of operation of the instrument 100, and which ultrasonic probe element is the pulser element. In response to triggering each of the ultrasonic probe elements 155 as a pulser element, the instrument may receive ultrasonic response signals from the set of receiver elements (425).

Therefore, it should be understood that, by leveraging the sliding receiver aperture together with the principle of acoustic reciprocity, example embodiments of the present invention are able to reduce acquisition time without increasing the number of acquisition units by acquiring ultrasonic response signals through a single pulsing of each ultrasonic probe element 155 (i.e., without repeated pulsing of a particular ultrasonic probe element as a pulser element to acquire all pulser-receiver pairs of ultrasonic response signals for the pulser element). Example embodiments of the present invention may process the received A-Scan data and the reciprocally deduced A-Scan data without storage and in parallel with, for example, separate beamforming conditions.

FIGS. 5A-5B are state diagrams illustrating relationships between a number M of ultrasonic probe receiver elements in the sliding receiver aperture and a maximum number $N_{MAX}$ of ultrasonic probe elements in pitch-catch and pulse-echo modes, respectively, according to an example embodiment of the present invention.

FIG. 5A is a state diagram illustrating the state of A-Scan data acquisition resulting from the above description of FIGS. 2A-2Q for M=8 ultrasonic probe elements in the sliding receiver aperture in pitch-catch mode (i.e., the pulser element i does not act as a receiver element j and, therefore, ultrasonic response signals are not received on the diagonal for j=i). As illustrated in FIG. 3A, in pitch-catch mode, the number of ultrasonic probe elements 155 to be pulsed N in acquiring A-Scan data is $2 \times M+1$ (e.g., N=17) and A-Scan data is acquired directly or assumed leveraging the principle of acoustic reciprocity for all pulser-receiver pairs FMC(i,j) except for those where the pulser element is acting as a receiver element (i.e., j=i).

FIG. 5B is a state diagram illustrating the state of A-Scan data acquisition for M=8 ultrasonic probe elements in the sliding receiver aperture in pulse-echo mode (i.e., the pulser element i also acts as a receiver element j). As illustrated in FIG. 3B, in pulse-echo mode, the number of ultrasonic probe elements 155 to be pulsed N in acquiring A-Scan data is $2 \times M-1$ (e.g., N=15) and A-Scan data is acquired directly or assumed leveraging the principle of acoustic reciprocity for all pulser-receiver pairs FMC(i,j) including those where the pulser element is acting as a receiver element (i.e., j=i).

Figures 1, 6A:
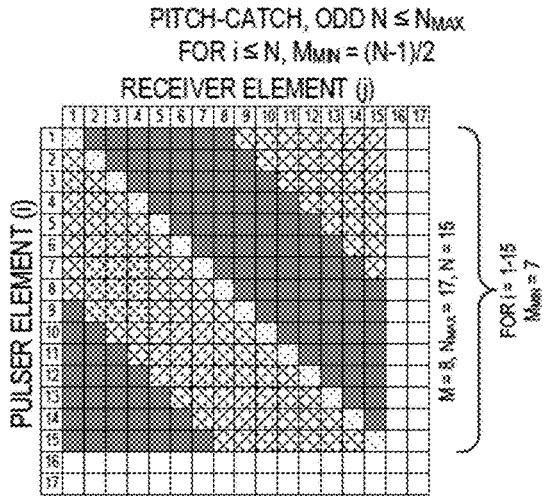
Figures 1, 6B:
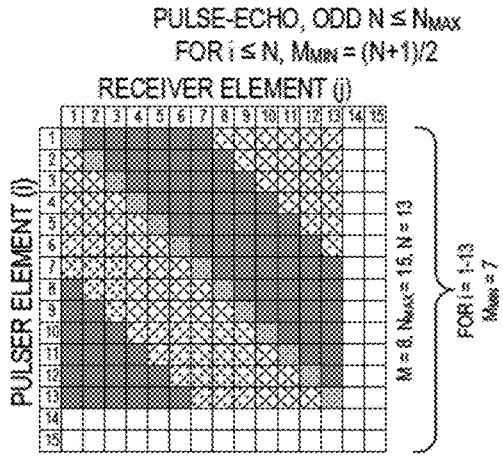
Figures 2, 6A:
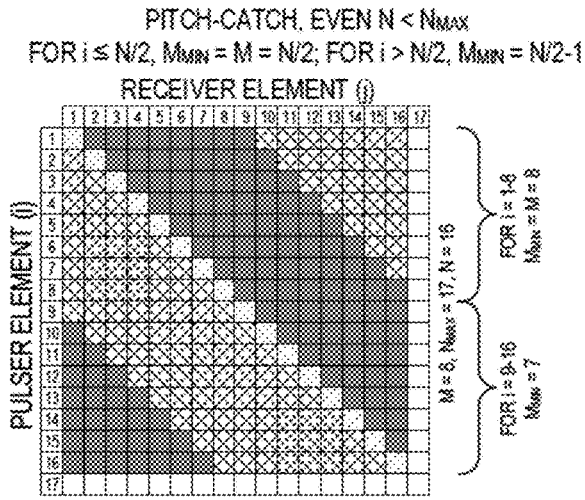
Figures 2, 6B:
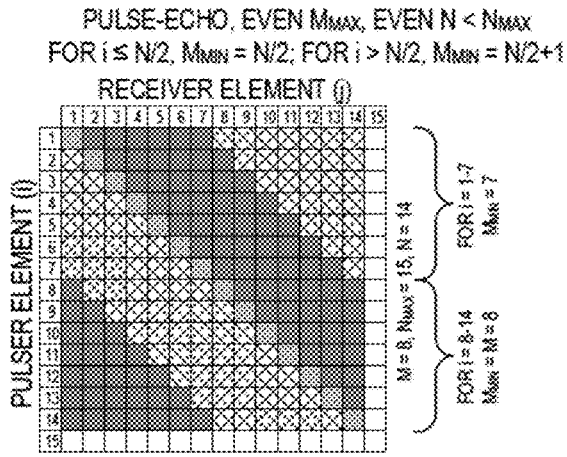

FIGS. 6A-1-6A-2 are state diagrams illustrating relationships between a number N of ultrasonic probe pulser elements and a minimum number $M_{MIN}$ of ultrasonic probe receiver elements for various ultrasonic probe pulser element values in pitch-catch and pulse-echo modes, respectively, according to an example embodiment of the present invention. It should be noted, however, that $M_{MIN}$ represents a minimum number of ultrasonic probe receiver elements in the sliding receiver aperture.

FIG. 6A-1 is a state diagram for an odd number of $N \leq N_{MAX}$ ultrasonic probe pulser elements in pitch-catch mode in which, for each pulser element $i \leq N$, a minimum number of receiver elements in the sliding receiver aperture $M_{MIN}$ is $(N-1)/2$ (i.e., the reciprocal of $N=2 \times M+1$). As illustrated in FIG. 6A-1, for M=8 ultrasonic probe receiver elements in the sliding receiver aperture, $N_{MAX}=17$ ultrasonic probe pulser elements. However, only N=15 ultrasonic probe pulser elements are selected for use and, therefore, as illustrated in FIG. 6A-1, for i=1-15, $M_{MIN}=7$.

FIG. 6B-1 is a state diagram for an odd number of $N \leq N_{MAX}$ ultrasonic probe pulser elements in pulse-echo mode in which, for each pulser element $i \leq N$, a minimum number of receiver elements in the sliding receiver aperture $M_{MIN}$ is $(N+1)/2$ (i.e., the reciprocal of $N=2 \times M-1$). As illustrated in FIG. 6B-1, for M=8 ultrasonic probe receiver elements in the sliding receiver aperture, $N_{MAX}=15$ ultrasonic probe pulser elements. However, only N=13 ultrasonic probe pulser elements are selected for use and, therefore, as illustrated in FIG. 6B-1, for i=1-13, $M_{MIN}=7$.

FIG. 6A-2 is a state diagram for an even number of $N<N_{MAX}$ ultrasonic probe pulser elements in pitch-catch mode in which, for each pulser element $i \leq N/2$, a minimum number of receiver elements in the sliding receiver aperture $M_{MIN}$ is $M=N/2$ and, for each pulser element $i>N/2$, a minimum number of receiver elements in the sliding receiver aperture $M_{MIN}$ is $N/2-1$. As illustrated in FIG. 6A-2, for M=8 ultrasonic probe receiver elements in the sliding receiver aperture, $N_{MAX}=17$ ultrasonic probe pulser elements. However, only N=16 ultrasonic probe pulser elements are selected and, therefore, as illustrated in FIG. 6A-1, for i=1-8, $M_{MIN}=M=7$ and, for i=9-16, $M_{MIN}=7$.

FIG. 6B-2 is a state diagram for an even number of $N \leq N_{MAX}$ ultrasonic probe pulser elements in pulse-echo mode in which, for each pulser element $i \leq N/2$, a minimum number of receiver elements in the sliding receiver aperture $M_{MIN}$ is $N/2$ and, for each pulser element $i>N/2$, a minimum number of receiver elements in the sliding receiver aperture $M_{MIN}$ is $N/2+1$. As illustrated in FIG. 6B-2, for M=8 ultrasonic probe receiver elements in the sliding receiver aperture, $N_{MAX}=15$ ultrasonic probe pulser elements. However, only N=14 ultrasonic probe pulser elements are selected and, therefore, as illustrated in FIG. 6B-2, for i=1-7, $M_{MIN}=7$ and, for i=9-14, $M_{MIN}=M=8$.

Figure 7:
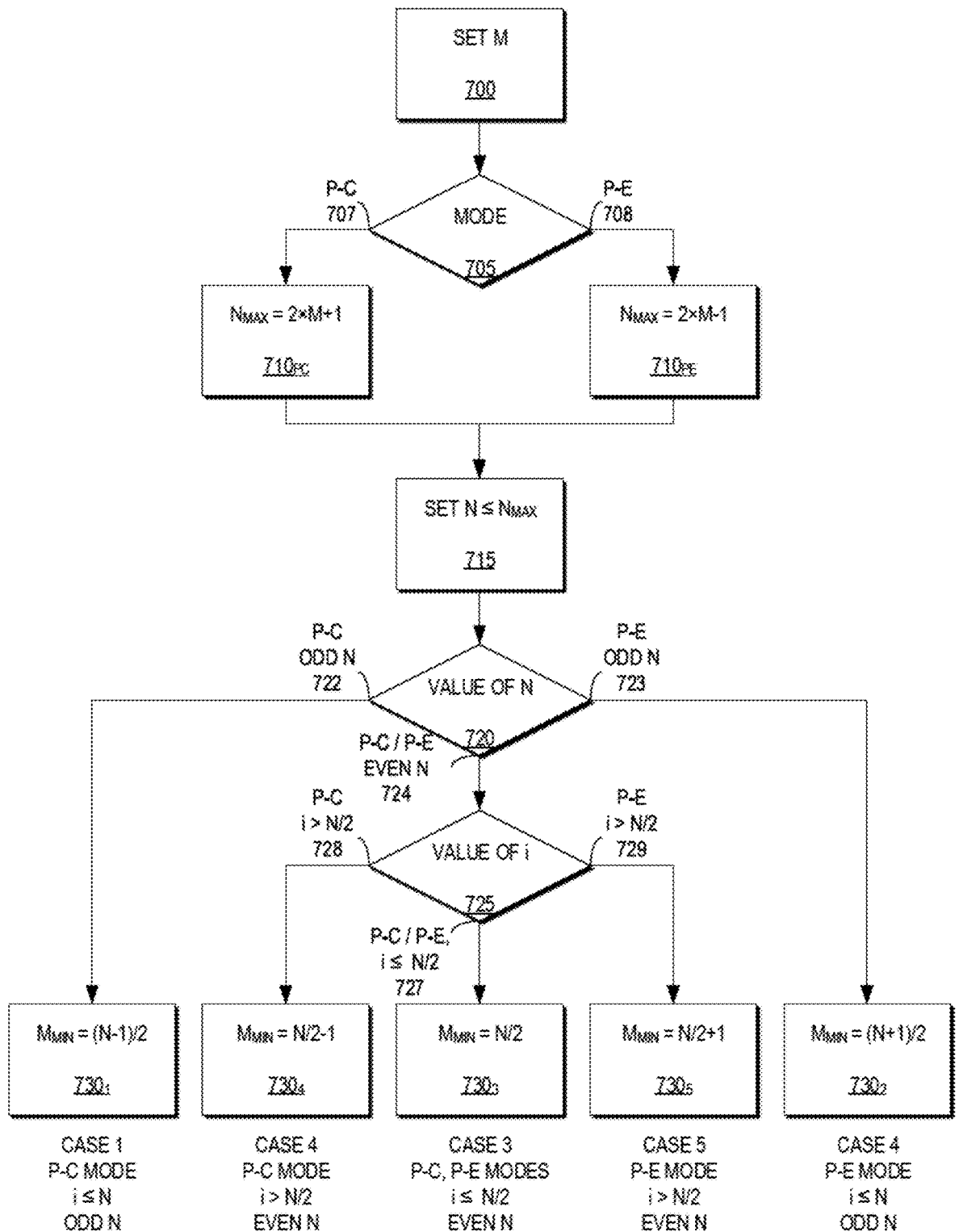
FIG. 7 is a flow diagram illustrating a method for setting a number N of ultrasonic probe pulser elements according to a number M of ultrasonic probe receiver elements and determining a minimum number $M_{MIN}$ of ultrasonic probe receiver elements for various ultrasonic probe pulser element values i in pitch-catch and pulse-echo modes, respectively, according to an example embodiment of the present invention.

FIG. 7 is a flow diagram illustrating a method for setting a number N of ultrasonic probe pulser elements according to a number M of ultrasonic probe receiver elements and determining a minimum number $M_{MIN}$ of ultrasonic probe receiver elements for various ultrasonic probe pulser element values i in pitch-catch and pulse-echo modes, respectively, according to an example embodiment of the present invention;

FIG. 7 is a flow diagram illustrating a method for setting a number of ultrasonic probe pulser elements according to a set number of ultrasonic probe receiver elements and determining minimum number of ultrasonic probe receiver elements for various ultrasonic probe pulser element values in pitch-catch and pulse-echo modes, respectively, according to an example embodiment of the present invention. As illustrated in FIG. 7, the method starts by setting the value of the number of ultrasonic probe receiver elements in the sliding receiver aperture M (600). In most cases, this value M is determined according to the instrument electronics (e.g., acquisition units 120 and multiplexers) which typically yields and even number of ultrasonic probe receiver elements in the sliding receiver aperture M; however, example embodiments of the present invention need not use the maximum number of possible ultrasonic probe elements in the sliding receiver aperture and any value of available M ultrasonic probe receiver elements may be selected.

The instrument 100 then may determine its mode of operation (705) (e.g., pitch-catch mode or pulse-echo mode). If the instrument 100 is operating in pitch-catch mode (707), the instrument 100 then may set the maximum number of ultrasonic probe elements $N_{MAX}$ to be pulsed in acquiring A-Scan data to 2×M+1 ($710_{PC}$). However, if the instrument 100 is operating in pulse-echo mode (708), the instrument 100 then may set the maximum number of ultrasonic probe elements $N_{MAX}$ to be pulsed in acquiring A-Scan data to 2×M-1 ($710_{PE}$).

A number of ultrasonic probe elements $N \leq N_{MAX}$ to be pulsed then may be set (e.g., by an instrument operator) (715). The instrument 100 then may determine the value of N (720). If the instrument 100 is operating in pitch-catch mode and if the number of elements N is odd (722), the instrument 100 sets the minimum size of the sliding receiver aperture $M_{MIN}$ to (N-1)/2 ($730_1$). If the instrument 100 is operating in pulse-echo mode and if the number of elements N is odd (723), the instrument sets the minimum size of the sliding receiver aperture $M_{MIN}$ to (N+1)/2 ($730_2$).

However, for any even value of N in either pitch-catch mode or pulse-echo mode (724) the instrument determines the value of i compared to N (725). For any value of $i \leq N/2$ (727) in either pitch-catch mode or pulse-echo mode, the instrument sets the minimum size of the sliding receiver aperture $M_{MIN}$ to N/2 ($730_3$). If the instrument 100 is operating in pitch-catch mode and if the value of i is greater than N/2 (728), the instrument sets the minimum size of the sliding receiver aperture $M_{MIN}$ to N/2-1 ($730_4$). If the instrument is operating in pulse-echo mode and if the value of I is greater than N/2 (729), the instrument sets the minimum size of the sliding receiver aperture $M_{MIN}$ to N/2+1 ($730_5$).

Figure 8:
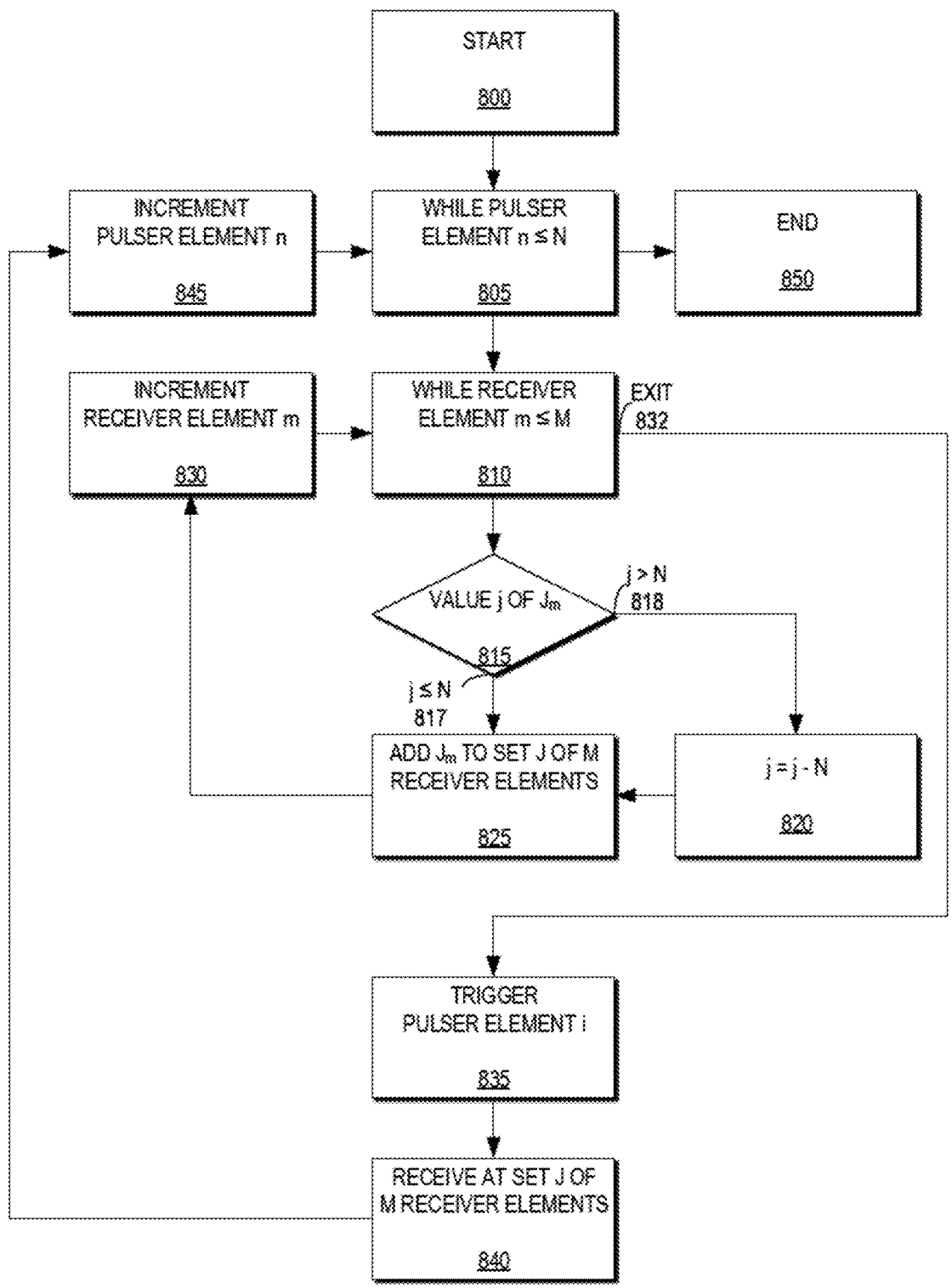
FIG. 8 is a flow diagram illustrating a method for assigning respective ultrasonic probe receiver elements $J_m$ to a set J defined as a sliding receiver aperture according to a principle of acoustic reciprocity for each ultrasonic probe pulser element n according to an example embodiment of the present invention.
Figure 9:
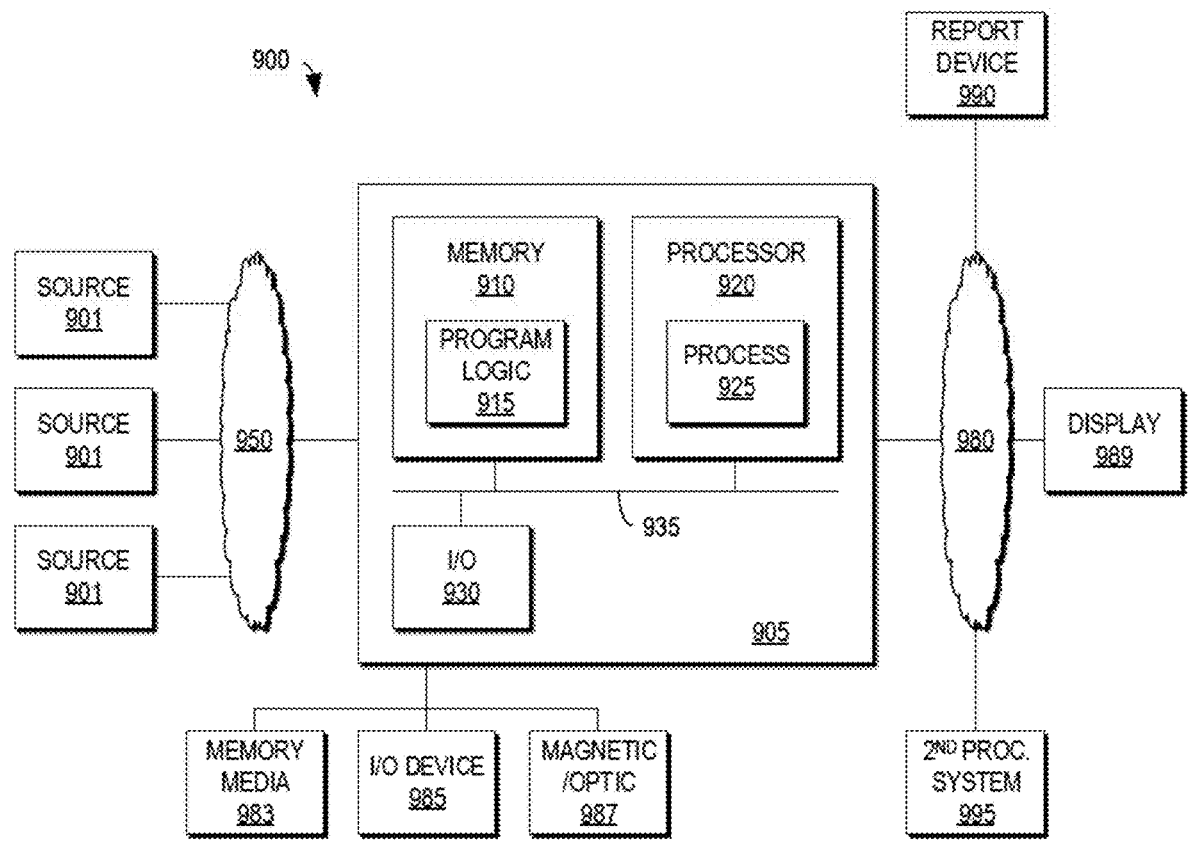
FIG. 9 is a block diagram illustrating an apparatus for acquiring phased array ultrasonic testing data leveraging a sliding receiver aperture defined according to the principle of acoustic reciprocity according to an example embodiment of the present invention.
Figure 10:
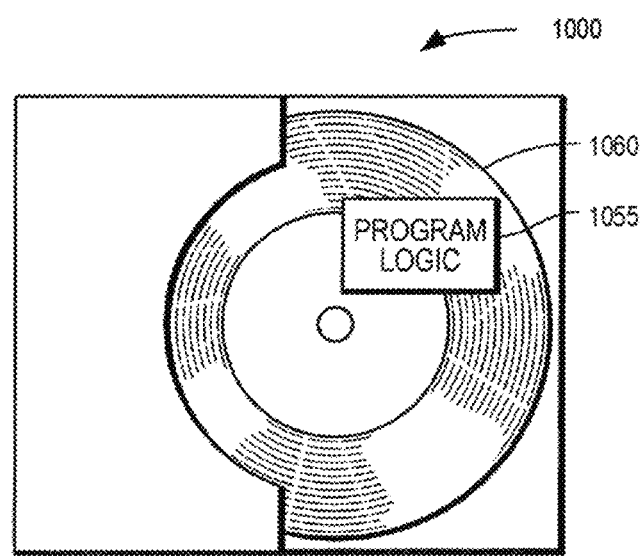
FIG. 10 is an illustration of an example embodiment of the present invention as embodied in computer program code for acquiring phased array ultrasonic testing data leveraging a sliding receiver aperture defined according to the principle of acoustic reciprocity.

FIG. 8 is a flow diagram illustrating a method for assigning respective ultrasonic probe elements $J_m$ to a set J defined as a sliding receiver aperture according to a principal of acoustic reciprocity for each ultrasonic probe pulser element n according to an example embodiment of the present invention. It should be understood that, as illustrated above with respect to FIGS. 2A-2Q, the set of ultrasonic probe elements J acting as receiver elements j in the sliding receiver aperture must be defined for each respective ultrasonic probe element acting as a pulser element i. Therefore, the first ultrasonic probe element acting as a receiver element in the sliding receiver aperture may be defined as $J_1$ and the last ultrasonic probe element acting as a receiver element in the sliding receiver aperture may be defined as $J_M$.

For example, as illustrated in FIGS. 2A-2Q, the first receiver element $J_1$ is $J_{i+1}$; however, it should be understood that in other example embodiments of the present invention, the set of receiver elements defining the sliding receiver aperture need not be sequential from the pulser element or even be a contiguous set of receiver elements as long as the sliding receiver aperture for each pulser element is defined such that it includes those elements for which reciprocal values cannot be assumed from pulsing of subsequent pulser elements.

As described above with respect to FIGS. 2J-2Q, as the sliding receiver aperture shifts, the upper limit of the set of receiver elements may go out of range of the set ultrasonic probe elements 155. Therefore, example embodiments of the present invention follow the method illustrated in FIG. 8 in which the set of receiver elements J in the sliding receiver aperture for each pulser element i is defined recursively according to the number of the pulser element (e.g., i) and the value of the receiver element j compared with the available range of ultrasonic probe elements (e.g., $J_m$ versus N).

As illustrated in FIG. 8, according to example embodiments of the present invention, the instrument 100 starts (800) and enters a first recursive loop for each pulser element i (i.e., while $n \leq N$) (805). Nested within the first recursive loop (805), according to example embodiments of the present invention, the instrument 100 enters a second recursive loop for each ultrasonic probe element m of the sliding receiver aperture M (i.e., while $m \leq M$) (810).

The instrument 100 then determine the value j of the current receiver element $J_m$ (815). If the value j of $J_m$ is less than or equal to N (817), the instrument 100 adds the receiver element $J_m$ to the set J of M receiver elements (825) and increments the value of m (830) to cycle through the M receiver elements in the sliding receiver aperture. However, if the value j of $J_m$ is greater than N (818) (i.e., the sliding receiver aperture should include ultrasonic probe elements that "wrap around" to the beginning of the ultrasonic probe), the instrument 100 sets the value of j to j−N (820) and then proceeds to add the receiver element $J_m$ to the set J of M receiver elements (825) and increments the value of m (830).

This second recursive loop (810) continues until m is greater than M at which point the method exits (832). The instrument 100 then may trigger the pulser element i (835), receive ultrasonic response signals at the set J of M receiver elements (840), and increment the pulser element n (845) to cycle through the N pulser elements. The method then returns to the first recursive loop (805) which continues until n is greater than N at which point the method ends (850).

FIG. 7 is a block diagram of an example embodiment apparatus 705 for acquiring phased array ultrasonic testing data leveraging the principle of acoustic reciprocity according to an example embodiment of the present invention. The apparatus 705 may be part of a system 700 and includes memory 710 storing program logic 715, a processor 720 for executing a process 725, and a communications I/O interface 730, connected via a bus 735. The exemplary apparatus 705 is discussed only for illustrative purpose and should not be construed as a limitation on the embodiments or scope of the present disclosure. In some cases, some devices may be added to or removed from a computer system 700 based on specific situations.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be embodied by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

FIG. 8 is a block diagram of a computer program product 800 including program logic 855, encoded on a computer-readable medium 860 in computer-executable code configured for acquiring phased array ultrasonic testing data leveraging the principle of acoustic reciprocity according to an example embodiment of the present invention. The logic for carrying out the method may be embodied as part of the aforementioned system, which is useful for carrying out a method described with reference to embodiments shown. In one embodiment, program logic 855 may be loaded into memory and executed by processor. In a further embodiment, program logic 855 may also be the same program logic 855 on a computer readable medium.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

Various exemplary embodiments of the present disclosure have been described with reference to the accompanying drawings. It may be appreciated that these example embodiments are provided only for enabling those skilled in the art to better understand and then further implement the present disclosure and not intended to limit the scope of the present disclosure in any manner. It should be noted that these drawings and description are only presented as exemplary embodiments and, based on this description, alternative embodiments may be conceived that may have a structure and method disclosed as herein, and such alternative embodiments may be used without departing from the principle of the disclosure as claimed in the present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that, in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

The terms "comprise(s)," "include(s)", their derivatives, and like expressions used herein should be understood to be open (i.e., "comprising/including, but not limited to"). The term "based on" means "at least in part based on", the term "one embodiment" means "at least one embodiment", and the term "another embodiment" indicates "at least one further embodiment". Relevant definitions of other terms have been provided.

What is claimed is:

1. A method for acquiring ultrasonic testing data leveraging a sliding receiver aperture defined according to a principle of acoustic reciprocity comprising:
    triggering each of a set of ultrasonic probe elements to pulse as a pulser element;
    for each pulser element, receiving response signals from a respective sliding receiver aperture defined according to the principle of acoustic reciprocity as a respective set of receiver elements comprised of a subset of the ultrasonic probe elements; and
    storing data corresponding to the respective response signals for each pair of pulser element and receiver element.

2. The method of claim 1 wherein receiving response signals from a respective sliding receiver aperture defined according to the principle of acoustic reciprocity as a respective set of receiver elements comprised of a subset of the ultrasonic probe elements comprises:
    determining for which ultrasonic probe elements response signals may be deduced by the principle of acoustic reciprocity according to response signals received from triggering the other ultrasonic probe elements as pulser elements;
    defining as the set of receiver elements in the sliding receiver aperture the ultrasonic probe elements for which response signals may not be deduced by the principle of acoustic reciprocity; and
    receiving ultrasonic response signals from the set of receiver elements in the sliding receiver aperture.

3. The method of claim 2 wherein determining for which ultrasonic probe elements response signals may be deduced by the principle of acoustic reciprocity according to response signals received from triggering the other ultrasonic probe elements as pulser elements comprises determining the set of set of receiver elements of the sliding receiver aperture according to a mode of operation and a number of ultrasonic probe elements in the set of ultrasonic probe elements.

4. The method of claim 2 wherein defining as the set of receiver elements the ultrasonic probe elements for which response signals may not be deduced by the principle of acoustic reciprocity comprises selecting ultrasonic probe elements for the sliding receiver aperture from a first range of ultrasonic probe elements and from a second range of ultrasonic probe elements.

5. The method of claim 1 wherein triggering each of a set of Ultrasonic probe elements to pulse as a pulser element comprises, in a first mode of operation, triggering as pulser elements one more than twice the number of ultrasonic probe elements in the sliding receiver aperture.

6. The method of claim 1 wherein triggering each of a set of ultrasonic probe elements to pulse as a pulser element comprises, in a second mode of operation, triggering as pulser elements one fewer than twice the number of ultrasonic probe elements in the sliding receiver aperture.

7. The method of claim 1 wherein receiving response signals from a respective sliding receiver aperture defined according to the principle of acoustic reciprocity as a respective set of receiver elements comprised of a subset of the ultrasonic probe elements comprises receiving response signals from a continuous set of receiver elements in the sliding receiver aperture.

8. The method of claim 1 wherein receiving response signals from a respective sliding receiver aperture defined according to the principle of acoustic reciprocity as a respective set of receiver elements comprised of a subset of the ultrasonic probe elements comprises receiving response signals from a plurality of discontinuous sets of receiver elements in the sliding receiver aperture.

9. The method of claim 1 wherein receiving response signals from a respective sliding receiver aperture defined according to the principle of acoustic reciprocity as a respective set of receiver elements comprised of a subset of the ultrasonic probe elements comprises recursively defining the set of receiver elements in each respective sliding receiver aperture.

10. The method of claim 1 wherein receiving response signals from a respective sliding receiver aperture defined according to the principle of acoustic reciprocity as a respective set of receiver elements comprised of a subset of the ultrasonic probe elements comprises defining each receiver element the set of receiver elements defining the sliding receiver aperture according to the pulser element, a number of the ultrasonic probe elements, and a number of the receiver elements.

11. A system for acquiring, ultrasonic testing data leveraging a sliding receiver aperture defined according to a principle of acoustic reciprocity comprising:
    a pulser configured to pulse each of a set of ultrasonic probe elements as a pulser element;
    an acquisition unit configured to, for each pulser element, receive response signals from a respective sliding receiver aperture defined according to the principle of acoustic reciprocity as a respective set of receiver elements comprised of a subset of the ultrasonic probe elements; and
    memory configured to store data corresponding to the respective response signals for each pair of pulser element and receiver element.

12. The system of claim 11 further comprising a processor and wherein the memory further stores instructions that, when executed on the processor, cause the system to:

determine for which ultrasonic probe elements response signals may be deduced by the principle of acoustic reciprocity according to response signals received from triggering the other ultrasonic probe elements as pulser elements;

define as the set of receiver elements in the sliding receiver aperture the ultrasonic probe elements for which response signals may not be deduced by the principle of acoustic reciprocity; and receive ultrasonic response signals from the set of receiver elements in the sliding receiver aperture.

13. The system of claim 12 wherein the memory further stores instructions that, when executed on the processor, cause the processor to determine the set of set of receiver elements in the sliding receiver aperture according to a mode of operation of the system and a number of ultrasonic probe elements in the set of ultrasonic probe elements.

14. The system of claim 12 wherein the memory further stores instructions that, when executed on the processor, cause the processor to select ultrasonic probe elements for the sliding receiver aperture from a first range of ultrasonic probe elements and from a second range of ultrasonic probe elements.

15. The system of claim 11 wherein, in a first mode of operation, the pulser is further configured to trigger as piker elements one more than twice the number of ultrasonic probe elements in the sliding receiver aperture.

16. The system of claim 11 wherein the pulser is further configured to, in a second, mode of operation, trigger as pulser elements one fewer than twice the number of ultrasonic probe elements in the sliding receiver aperture.

17. The system of claim 11 wherein the acquisition unit is further configured to receive response signals from a continuous set of receiver elements in the sliding receiver aperture.

18. The system of claim 11 wherein the acquisition unit is further configured to receive response signals from a plurality of discontinuous sets of receiver elements in the sliding receiver aperture.

19. The system of claim 11 further comprising a processor and wherein the memory further stores instructions that, when executed on the processor, cause the system to recursively define the set of receiver elements in each respective sliding receiver aperture.

20. The system of claim 11 further comprising a processor and wherein the memory further stores instructions that, when executed on the processor, cause the system to define each receiver element in the set of receiver elements defining the sliding receiver aperture according to the pulser element, a number of the ultrasonic probe elements, and a number of the receiver elements.

21. A computer program product having a non-transitory computer readable medium with computer program code stored thereon that, when executed on a processor, causes the processor to acquire ultrasonic testing data leveraging a sliding receiver aperture defined according to a principle of acoustic reciprocity, the computer program code comprising:

computer program code comprising for triggering each of a set of ultrasonic probe elements to pulse as a pulser element;

computer program code comprising for, for each piker element, receiving response signals from a respective sliding receiver aperture defined according to the principle of acoustic reciprocity as a respective set of receiver elements comprised of a subset of the ultrasonic probe elements; and computer program code comprising for storing data corresponding to the respective response signals for each pair of pulser element and receiver element.

* * * * *

UNITED STATES PATENT AND TRADEMARK OFFICE
CERTIFICATE OF CORRECTION

PATENT NO. : 11,150,222 B2  
APPLICATION NO. : 16/575523  
DATED : October 19, 2021  
INVENTOR(S) : Benoit Lepage Page 1 of 1

It is certified that error appears in the above-identified patent and that said Letters Patent is hereby corrected as shown below:

In the Claims

In Column 13, Line 38, in Claim 1, delete "element," and insert --element-- therefor In Column 14, Line 12, in Claim 5, delete "Ultrasonic" and insert --ultrasonic-- therefor In Column 14, Line 47, in Claim 10, after "element", insert --in--

In Column 14, Line 51, in Claim 11, delete "acquiring," and insert --acquiring-- therefor In Column 15, Line 26, in Claim 15, delete "piker" and insert --pulser-- therefor In Column 15, Line 30, in Claim 16, delete "second," and insert --second-- therefor In Column 16, Line 27, in Claim 21, delete "piker" and insert --pulser-- therefor Signed and Sealed this  
Fourth Day of January, 2022

Drew Hirshfeld  
*Performing the Functions and Duties of the  
Under Secretary of Commerce for Intellectual Property and  
Director of the United States Patent and Trademark Office*